United States Patent
Chen et al.

(10) Patent No.: US 10,976,621 B2
(45) Date of Patent: Apr. 13, 2021

(54) DISPLAY DEVICE

(71) Applicant: InnoLux Corporation, Miao-Li County (TW)

(72) Inventors: Chien-Hung Chen, Miao-Li County (TW); Bo-Chin Tsuei, Miao-Li County (TW); Hsia-Ching Chu, Miao-Li County (TW); Mei-Chun Shih, Miao-Li County (TW)

(73) Assignee: INNOLUX CORPORATION

( * ) Notice: Subject to any disclaimer, the term of this patent is extended or adjusted under 35 U.S.C. 154(b) by 0 days.

(21) Appl. No.: 16/441,871

(22) Filed: Jun. 14, 2019

(65) Prior Publication Data

US 2019/0294013 A1 Sep. 26, 2019

Related U.S. Application Data

(63) Continuation of application No. 15/429,210, filed on Feb. 10, 2017, now Pat. No. 10,365,525.

(30) Foreign Application Priority Data

Feb. 18, 2016 (TW) .................................. 10510471.6

(51) Int. Cl.
*G02F 1/1362* (2006.01)
*G02F 1/1343* (2006.01)

(52) U.S. Cl.
CPC .. *G02F 1/136286* (2013.01); *G02F 1/134309* (2013.01); *G02F 1/134363* (2013.01); *G02F 1/136259* (2013.01); *G02F 2001/134318* (2013.01); *G02F 2001/134381* (2013.01); *G02F 2001/136263* (2013.01); *G02F 2201/121* (2013.01); *G02F 2201/122* (2013.01); *G02F 2201/124* (2013.01)

(58) Field of Classification Search
CPC ......... G02F 1/134309; G02F 1/134363; G02F 1/136286
See application file for complete search history.

(56) References Cited

U.S. PATENT DOCUMENTS

| | | | |
|---|---|---|---|
| 7,719,652 B2 * | 5/2010 | Son | .................... G02F 1/134363 349/141 |
| 10,365,525 B2 * | 7/2019 | Chen | |
| 2015/0098042 A1 * | 4/2015 | Hirosawa | .......... G02F 1/136286 349/47 |

FOREIGN PATENT DOCUMENTS

| JP | 2000292803 A | 10/2000 |
|---|---|---|
| TW | I242094 B | 10/2005 |

* cited by examiner

*Primary Examiner* — Dung T Nguyen

(74) *Attorney, Agent, or Firm* — Bacon & Thomas, PLLC

(57) ABSTRACT

A display device is disclosed, which includes: a first substrate; a plurality of scan lines and a plurality of data lines, wherein the plurality of scan lines intersects with the plurality of data lines, the plurality of scan lines and the plurality of data lines are disposed above the first substrate, and the plurality of scan lines extend along a first direction; a common electrode disposed above the first substrate, wherein the common electrode has a first part extending along the first direction, a second part substantially parallels to the one of the plurality of data lines, and the first part connects to the second part.

17 Claims, 8 Drawing Sheets

DISPLAY DEVICE

CROSS REFERENCE TO RELATED APPLICATION

This application claims the benefits of the Taiwan Patent Application Serial Number 105104716, filed on Feb. 18, 2016, the subject matter of which is incorporated herein by reference.

This application is a continuation (CA) of U.S. patent application for "DISPLAY DEVICE", U.S. application Ser. No. 15/429,210 filed Feb. 10, 2017, and the subject matter of which is incorporated herein by reference.

BACKGROUND

1. Field

The present disclosure relates to display devices, and more particularly to a display device that improves breakage of its data lines without compromising transmittance.

2. Description of Related Art

With the continuous development of technology related to displays, there is a trend in the display industry toward more compact, thinner and lighter product's. Thus, thin displays, such as liquid crystal display devices, organic light-emitting diode display devices and inorganic light-emitting diode display devices have substituted for CRT displays as the dominant display devices in the market. Thin displays have an extensive application scope, and we can see them in many of consumer electronics, such as mobile phones, laptops, video cameras, still cameras, music players, mobile navigators, TV sets, etc.

Therein, liquid crystal display devices have been well developed and popular among consumers. However, in view of the consumers' increasing requirements to display quality of display devices, almost every dealer in this industry is investing in advanced display devices particularly in terms of display quality.

As liquid crystal display devices have entered an era of high resolution, transmittance of panels is now a key factor to the resulting display quality. Therefore, the relevant dealers all look to transmittance and contrast when improving display quality of display devices.

A display device uses data lines to transmit signals and uses scan lines to control thin film transistors, thereby sending signals to pixels and in turn visually presenting images. Thus, in the event of breakage of any data lines, the signals cannot be transmitted into corresponding pixels, and this leads to poor display.

In view of this, there is a need for a novel display device that could solve issue of breakage of the data lines without compromising transmittance and satisfies consumers.

SUMMARY

A primary objective of the present disclosure is to provide a display device that has a common electrode that includes an end part overlapping partially with a corresponding data line so as to allow reparation of any broken data lines.

Another objective of the present disclosure is to provide a display device that has angularly arranged pixel electrodes, so as to ensure good transmittance of the display device.

In one aspect of the present disclosure, a display device comprises: a first substrate; plural scan lines and plural data lines, wherein the scan lines intersect with the data lines respectively, the plurality of scan lines and the plurality of data lines are disposed above the first substrate, and the scan lines extend along a first direction; a common electrode disposed above the first substrate; a second substrate opposite to the first substrate; and a display medium layer disposed between the first substrate and the second substrate. Therein, the common electrode comprises a first part extending along the first direction, a second part extending along and corresponding to the data lines, and an end part. The first part connects to the second part. The end part connects to the second part so that a first angle included between the end part and the second part is larger than 0 degree and smaller than 180 degrees, and the end part overlaps partially with one of the data lines adjacent to the end part.

In another aspect of the present disclosure, a display device comprises: a first substrate; a first electrode disposed above the first substrate and at least comprising a first finger portion and an extended portion, wherein the first finger portion connects to the extended portion and include a second angle that is greater than 90 degrees and smaller than 180 degrees; a second electrode disposed above the first substrate and comprising a first connecting portion, plural buffer portions and plural second finger portions, wherein the first connecting portion connects to the buffer portions, and the buffer portions connect to the second finger portions respectively, in which the first finger portion is between two adjacent said second finger portions, and the buffer portions comprise a first buffer portion, the first buffer portion and one of the second finger portions connecting to the first buffer portion includes a third angle, the third angle is smaller than 180 degrees, and the difference between the third angle and the second angle is equal to or less than 27 degrees; a second substrate opposite to the first substrate; and a display medium layer disposed between the first electrode and the second substrate.

In the disclosed display device, the common electrode has a first part, a second part and an end part. The second part is between the first part and the end part, and is corresponding to the data lines. The end part overlaps partially with one of the data lines. Therefore, in the event of breakage of any data lines, by welding the broken data line and the end part, the signal originally carried by the data line can be transmitted through the second part and the end part. Thereby, the signal interruption caused by the broken data line can be solved. Additionally, in the disclosed display device, in the first electrode and the second electrode served as pixel electrodes, the first finger portion and the extended portion of the first electrode include a second angle while the second finger portion and the buffer portion of the second electrode include a third angle. By designing the relation between the second angle and the third angle, the disclosed display device can have improved transmittance.

Other objects, advantages, and novel features of the present disclosure will become more apparent from the following detailed description when taken in conjunction with the accompanying drawings.

DETAILED DESCRIPTION OF THE EMBODIMENT

The following embodiments when read with the accompanying drawings are made to clearly exhibit the above-mentioned and other technical contents, features and effects of the present disclosure. Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

Furthermore, the ordinals recited in the specification and the claims such as "above", "over", or "on" are intended not only directly contact with the other substrate or film, but also intended indirectly contact with the other substrate or film.

Figure 1:
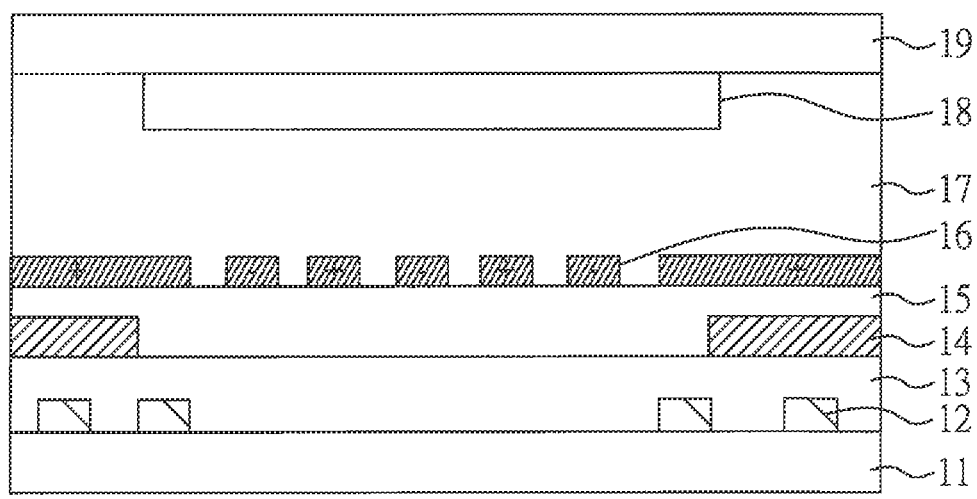
FIG. 1 is a schematic cross-sectional view of a display device of an embodiment of the present disclosure.

FIG. 1 is a schematic cross-sectional view of a display device of an embodiment of the present disclosure. As shown, the disclosed display device comprises: a first substrate 11; a second substrate 19 opposite to the first substrate 11; and a display medium layer 17 disposed between the first substrate 11 and the second substrate 19. In the present embodiment, the first substrate 11 and the second substrate 19 may be made of glass, plastic or a flexible material. The display medium layer 17 may be a liquid crystal layer. In addition, other elements may be disposed above the first substrate 11 and on the second substrate 19.

In the present embodiment, a first conducting layer 12, a first insulating layer 13, a second conducting layer 14, a second insulating layer 15 and a third conducting layer 16 are disposed above the first substrate 11 successively. Therein, the first insulating layer 13 and the second insulating layer 15 may be made of an insulating material such as an oxide, a nitride, or a nitrogen oxide. The first conducting layer 12, the second conducting layer 14 and the third conducting layer 16 may be made of an electrically conductive material, such as a metal, an alloy, a metallic oxide, a metallic nitrogen oxide, or other electrode materials. However, elements provided on the first substrate 11 of the disclosed display device are not limited to those shown in FIG. 1, and may include more layers that form a thin film transistor unit, such as an active layer and other insulating layers. Moreover, in the present embodiment, a color filtering layer 18 is formed at one side of the second substrate 19.

In the display device of FIG. 1, the first substrate 11 and the elements thereon form a thin film transistor substrate, and the second substrate 19 forms a color filter substrate. However, the present disclosure is not limited thereto. The color filtering layer 18 on the second substrate 19 may be alternatively disposed above the first substrate 11. In this case, the first substrate 11 and the elements thereon form a thin film transistor substrate having an integrated color filter array (i.e. a color filter or a array, or a COA).

Figure 2:
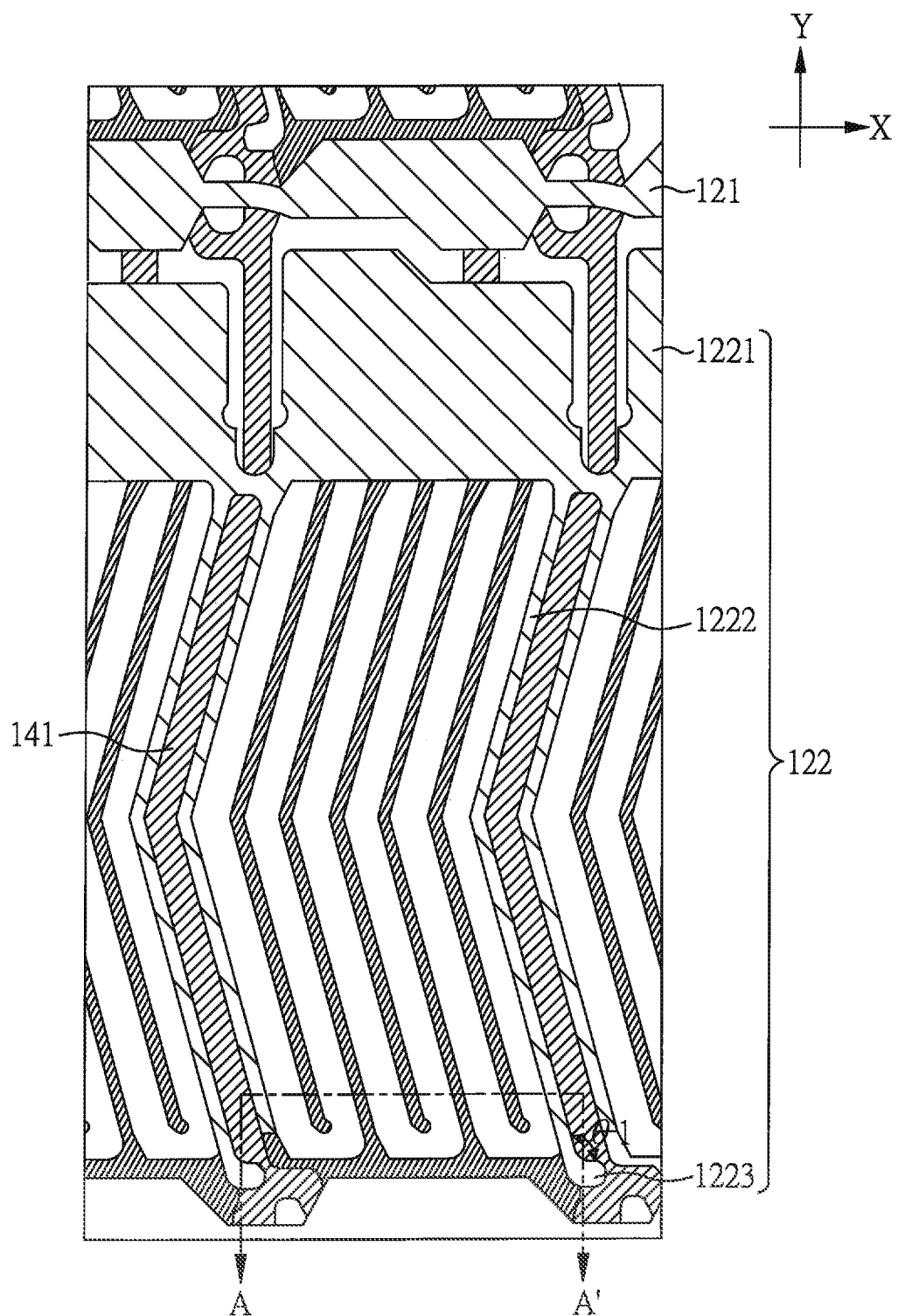
FIG. 2 is a bottom view of a display device of an embodiment of the present disclosure.

FIG. 2 is a bottom view of a display device of an embodiment of the present disclosure as seen from the underside of the first substrate 11 of FIG. 1 toward the second substrate 19. FIG. 1 is actually a cross-sectional view taken along the section line A-A' of FIG. 2. As shown in FIG. 1 and FIG. 2, the display device of the present embodiment includes: a first substrate 11; plural scan lines 121 and plural data lines 141, wherein the scan lines 121 intersect with the data lines 141, and the scan lines 121 and the data lines 141 are disposed above first substrate 11, and the scan lines 121 extend along a first direction X; a common electrode 122 disposed above the first substrate 11; a second substrate 19 opposite to the first substrate 11; a display medium layer 17 disposed between the first substrate 11 and the second substrate 19. Therein, the common electrode 122 comprises a first part 1221 extending along the first direction X, a second part 1222 extending along and corresponding to the data lines 141, and an end part 1223. The first part 1221 connects to the second part 1222. The end part 1223 connects to the second part 1222 that a first angle θ1 larger than 0 degree and smaller than 180 degrees is included between the end part 1223 and the second part 1222. The end part 1223 overlaps partially with one of the data line 141 adjacent to the end part 1223. The second part 1222 and the adjacent data lines 141 are substantially parallel, which means the second part 1222 and the adjacent data lines 141 are parallel or angles included between the second part 1222 and the adjacent data lines 141 are equal to or less than 5 degree. In addition, the second part 1222 may have an inclined "L" shape. Herein, the first conducting layer 12 includes scan lines 121 and the common electrode 122, and the second conducting layer 14 includes the data lines 141. In addition, the end part 1223 has a curve structure. It is to be noted that the plural scan lines 121 intersect with the plural data lines 141 respectively, and the plural scan lines 121 and the plural data lines 141 are disposed above the first substrate 11 so as to form plural sub-pixels (not shown). Each of the sub-pixels is corresponding to a common electrode 122, and the common electrodes 122 of the adjacent sub-pixels may connect to each other.

Figure 3:
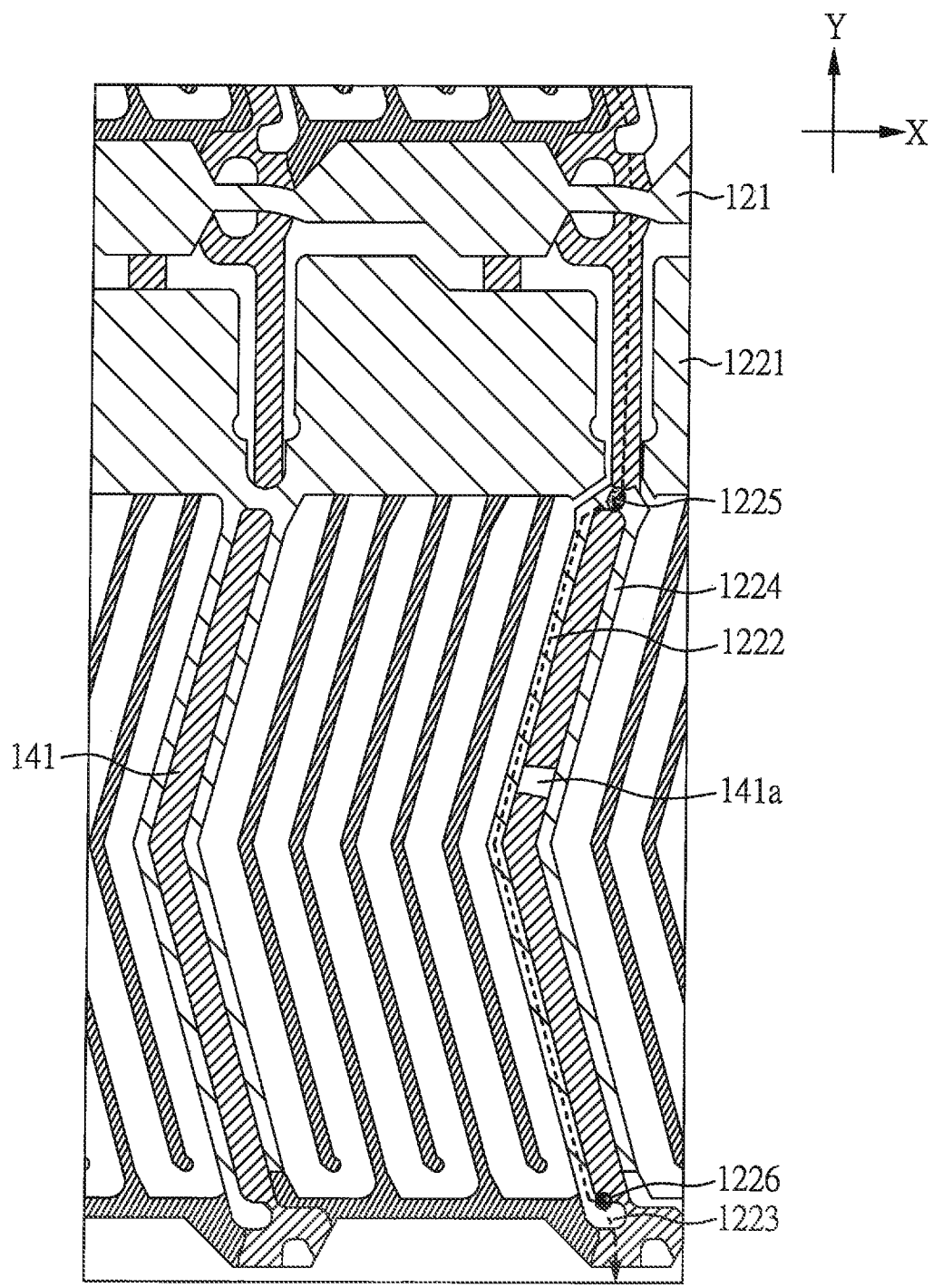
FIG. 3 is a schematic drawing illustrating reparation for a broken data line in a display device of an embodiment of the present disclosure.

In the present embodiment, the second part 1222 of the common electrode 122 is corresponding to the data lines 141, while the end part 1223 overlaps partially with one of the data lines 141. Therefore, in the breakage of any data lines 141, by welding the data line 141 and the corresponding end part 1223, the signal on the data line 141 can be transmitted through the second part 1222 and the end part 1223, so as to resume signal transmission for the broken data line 141. More particularly, as shown in FIG. 3 which illustrates reparation for a broken data line 141, in the event that the data line 141 has a defect 141*a* and the signal transmission thereon is interrupted, the reparation involves disconnecting the first part 1221 and the second part 1222 of the common electrode 122 and welding the second part 1222 and the end part 1223 respectively to the data line 141 at welding points 1225 and 1226. At this time, as indicated by the dotted arrow, when a signal is sent into the data lies 141, the signal is first sent to the second part 1222 through the welding point 1225 connecting the second part 1222 and the data line 141, and then goes through the welding point 1226 that connects the end part 1223 and the data line 141 before leaving from the data line 141. Thereby, the signal interruption caused by the defect in the data line 141 can be solved.

As shown in FIG. 3, for reliable formation of the welding point 1226 between the end part 1223 and the data line 141, the end part 1223 must have an area sufficient to accommodate the welding point 1226. However, a larger end part 1223 means greater RC loading between the end part 1223 and the data line 141. Thus, in the present embodiment, the end part 1223 is especially designed in terms of area to reconcile high reliability or low RC loading.

Figure 4:
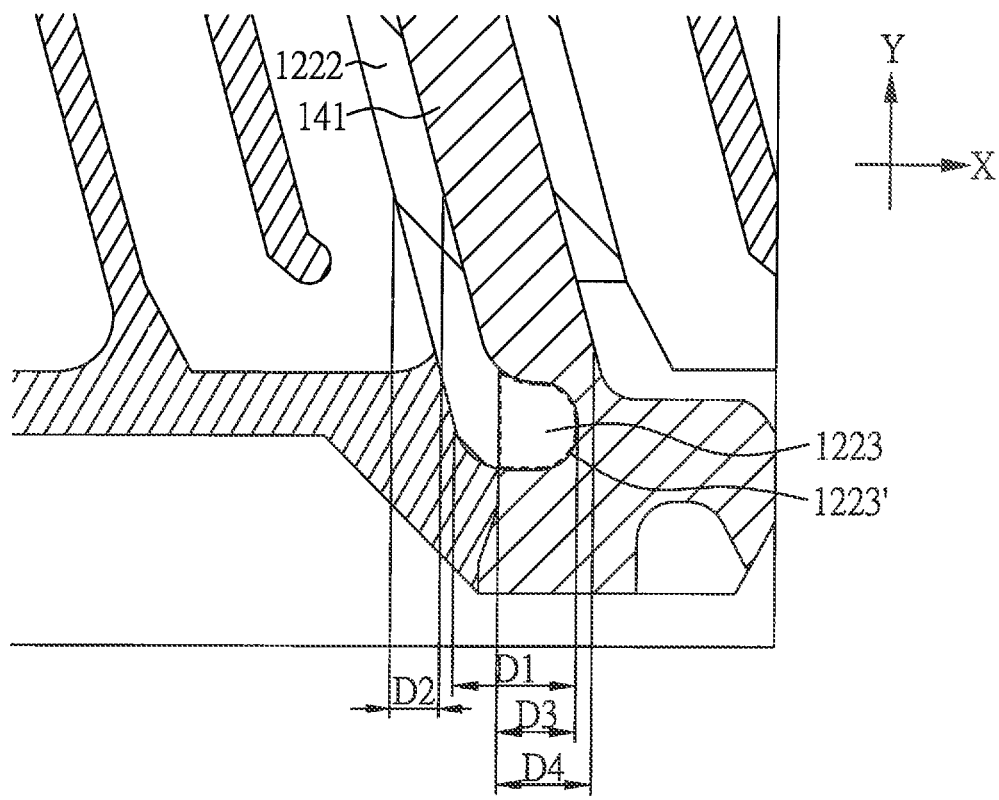
FIG. 4 is a partial enlarged view of the lower right corner of the display device of FIG. 2.

FIG. 4 is a partial enlarged view of the lower right corner of the display device of FIG. 2. As shown in FIG. 4, in the display device of the present embodiment, the end part 1223 has a maximum width D1 in the first direction X greater than a width D2 of the second part 1222 in the first direction X. In addition, the end part 1223 has an overlapping portion 1223' overlapping with one of the data line 141, and the ratio of the maximum width D3 of the overlapping region 1223' in the first direction X to the width D4 of the one of the data line 141 in the first direction X (i.e. the coverage of the end part 1223) is greater than 0 and smaller than 1, for example, greater than 0.2 and smaller than 0.95. It should be noted that the width D4 of the data line 141 is defined as the width of the portion of the data line 141 substantially parallel to the second part 1222 of the common electrode 122.

Figure 5:
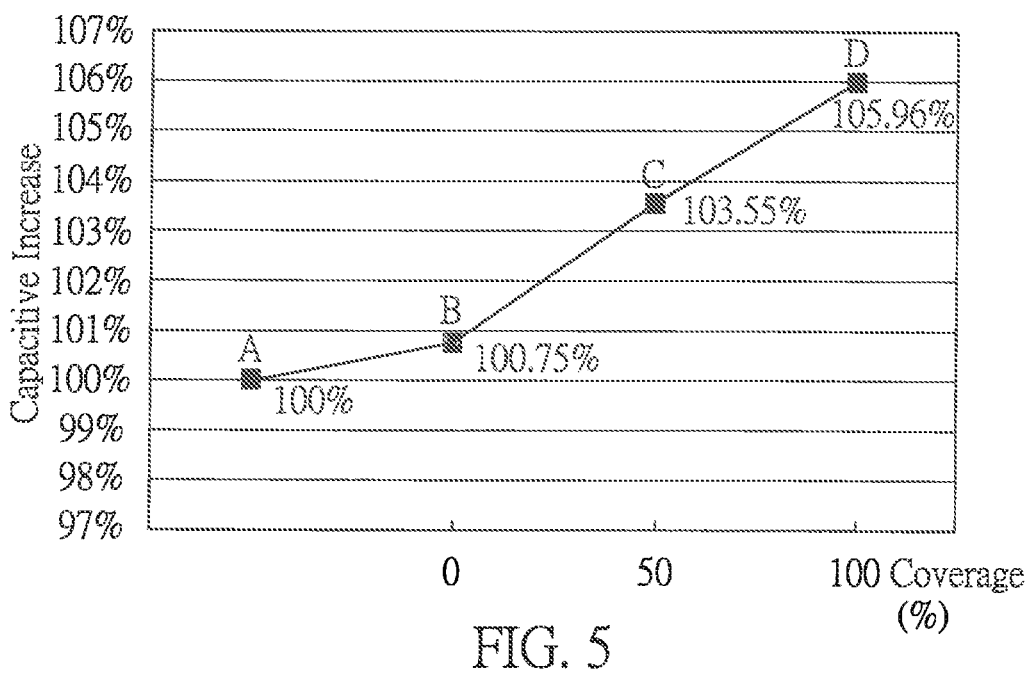
FIG. 5 is a diagram showing the coverage of the end part versus the capacitance variation between the end part and the data line in a display device of an embodiment of the present disclosure.

FIG. 5 is a diagram showing the coverage of the end part versus the capacitance variation between the end part and the data line in a display device of an embodiment of the present disclosure. Please also refer to FIG. 4. FIG. 5 reflects different arrangements including: the common electrode having no end part 1223 (i.e. the maximum width D1 being 0 μm, corresponding to the data point A in FIG. 5); the end part 1223 having its edge flush with the edge of the data line 141 (i.e. maximum width D3 being 0 μm, corresponding to the data point B in FIG. 5); the end part 1223 overlapping partially with the data line 141 (i.e. 0 μm< the maximum width D3< the width D4, corresponding to the data point C in FIG. 5); and the end part 1223 fully overlapping with the data line 141 (i.e. the maximum width D3 being equal to or greater than the width D4, corresponding to the data point D in FIG. 5). Therein, the coverage of the X axis is the ratio between the maximum width D3 and the width D4 (i.e. D3/D4), and on the Y axis, it is assumed that the 100% capacitance is obtained when there is not an end part 1223. As shown in FIG. 5, the closer the edge of the end part 1223 and the edge of the data lines 141 is, the greater the capacitance between the end part and the data line is, and the maximum capacitance appears when the maximum width D3 of the overlapping region 1223' of the end part 1223 in the first direction X is equal to the width D4 of the data line 141 in the first direction X (D3=D4). In a display device, a high capacitive load leads to delayed signal transmission.

For making the welding point allowing both high reliability and low RC loading, the proportion of the maximum width D3 to the width D4 (i.e. D3/D4) of the data line 141 has be to greater than 0 and smaller than 1, for example, greater than 0.2 and smaller than 0.95. In addition, while the data points A and B shown in FIG. 5 are both associated with the case where the end part 1223 does not overlap the data line 141, when the edge of the end part 1223 is flush with the edge of the data lines 141, lateral capacitance exists between the end part 1223 and the data line 141. As shown in FIG. 4, the width D4 of the one of the data line 141 in the first direction X is greater than the width D2 of the second part 1222 in the first direction X.

Figure 6:
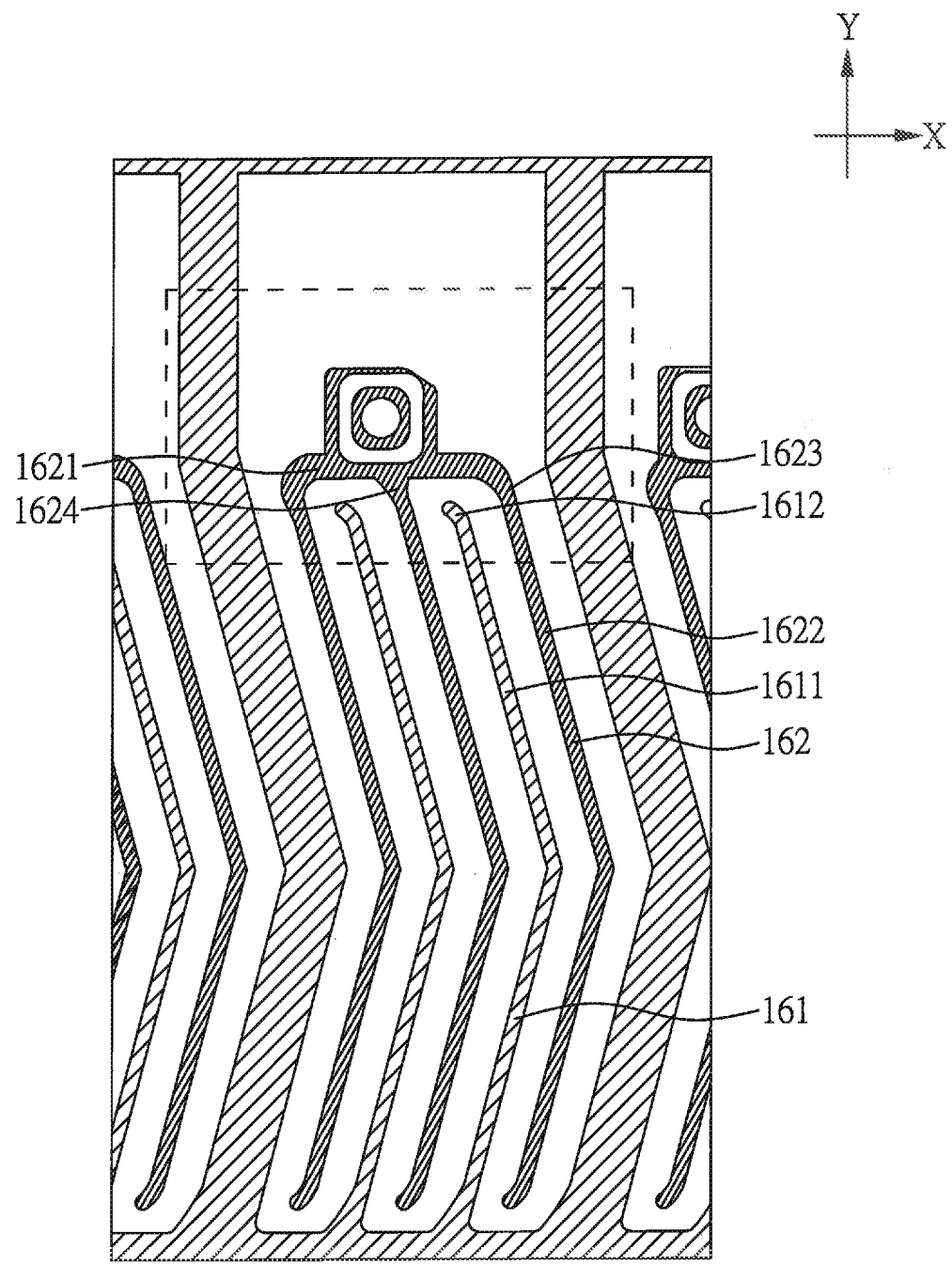
FIG. 6 is a top view of a display device of the embodiment of the present disclosure.
Figure 7:
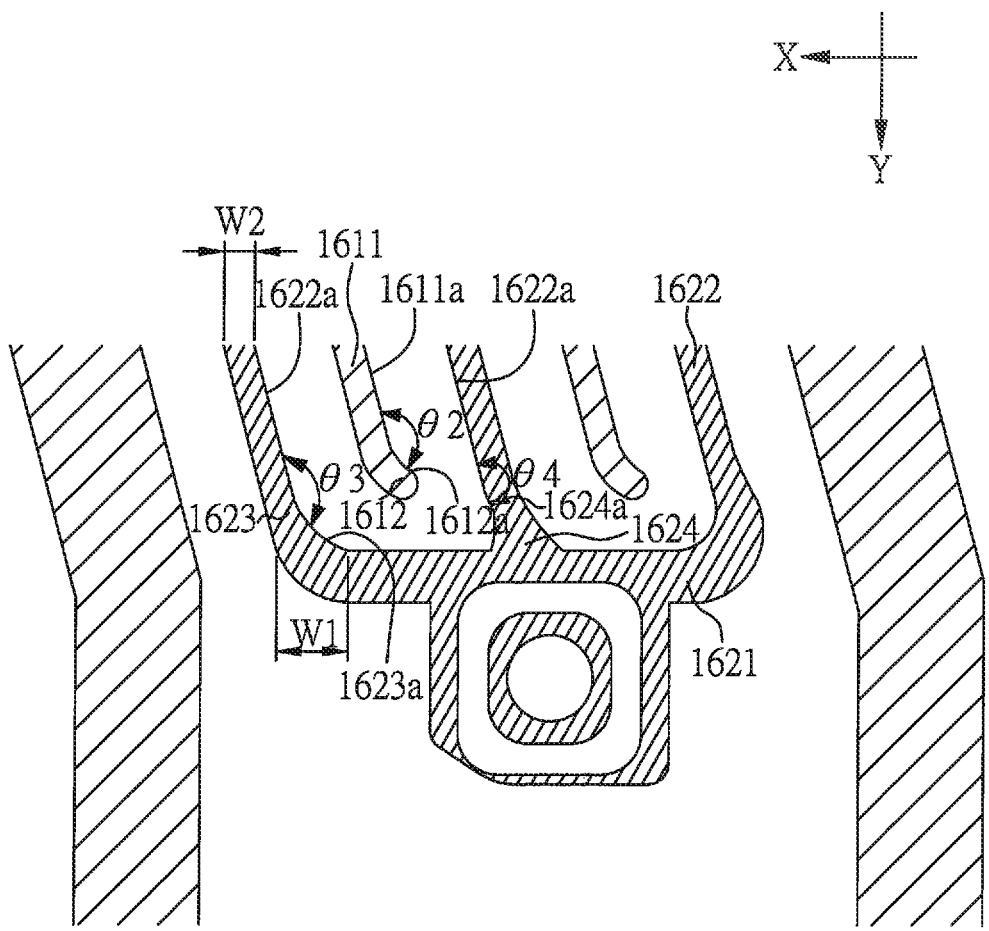
FIG. 7 is a partial enlarged view of FIG. 6 showing the region defined by the dotted area of the display device.

FIG. 6 is a top view of a display device of the embodiment of the present disclosure as seen from the top of the second substrate 19 of FIG. 1 toward the first substrate 11. In addition, FIG. 7 is a partial enlarged view of FIG. 6 showing the region defined by the dotted area of the display device. FIG. 7 is actually a view after a 180-degree rotation of FIG. 6. As shown in FIG. 1, FIG. 6 and FIG. 7, the display device of the present embodiment further comprises: a first electrode 161 disposed above first substrate 11 and at least comprising a first finger portion 1611 and an extended portion 1612, wherein the first finger portion 1611 connects to the extended portion 1612, a second angle θ2 is included between the first finger portion 1611 and the extended portion 1612, and the second angle θ2 is greater than 90 degrees and smaller than 180 degrees; and a second electrode 162 disposed above first substrate 11 and comprising a first connecting portion 1621, plural buffer portions (including first buffer portions 1623 and second buffer portions 1624) and plural second finger portions 1622, wherein the first connecting portion 1621 connects to the buffer portions, and the buffer portions connect to the second finger portions 1622 respectively. Therein, the buffer portion includes a first buffer portion 1623. The first buffer portion 1623 and the second finger portion 1622 connecting to the first buffer portion 1623 include a third angle θ3, the third angle θ3 is smaller than 180 degrees, and the difference between the third angle θ3 and the second angle θ2 is equal to or less than 27 degrees. Herein, the second angle θ2 is the angle included by the edge 1611*a* of the first finger portion 1611 and the edge 1612*a* of the extended portion 1612. The third angle θ3 is the angle included by the edge 1622*a* of the second finger portion 1622 and the edge 1623*a* of the first buffer portion 1623, and the edge 1622*a* of the second finger portion 1622 and the edge 1623*a* of the first buffer portion 1623 are adjacent to the first electrode 161. Herein, the first finger portion 1611 is disposed between two adjacent second finger portions 1622. The first finger portion 1611 and the second finger portions 1622 each have an inclined "L" shape.

It is to be herein noted that while the first electrode 161 and the second electrode 162 in FIG. 6 and FIG. 7 are hatched differently, such a difference is only intended to differentiate between the first electrode 161 and the second electrode 162. The first electrode 161 and the second electrode 162 are both in the third conducting layer 16 and are coplanar. In another embodiment, the first electrode 161 and the second electrode 162 are manufactured by the same process, which means the first electrode 161 and the second electrode 162 could be manufactured at the same time. Furthermore, in this embodiment, the second electrode 162 is electrically connecting to one of the data lines (not shown), while the first electrode 161 is electrically isolated from the one of the data lines. However, in other embodiments, the first electrode 161 is electrically connecting to one of the data lines, while the second electrode 162 is electrically isolated form the one of the data lines. Moreover, in the display device of the present embodiment, one of the buffer portions (including the first buffer portions 1623 and the second buffer portions 1624) refers to a region where the width W1 in the first direction X is greater than the width W2 of one of the second finger portions 1622 in the first direction X. Additionally, in the display device of the present embodiment, the first finger portion 1611 is substantially parallel to the data line 141, and the first finger portion 1611 and the second finger portions 1622 are substantially parallel to each other.

As shown in FIG. 1 and FIG. 7, for facilitating the swinging of the display medium in the display medium layer 17 (e.g. liquid crystal molecules) so as to reduce disinclination and improve transmittance, the second angle θ2 included by the extended portion 1612 and the first finger portion 1611 of the first electrode 161 is greater than 90 degrees and smaller than 180 degrees. Similarly, the third angle θ3 included by the first buffer portion 1623 and the second finger portion 1622 is also smaller than 180 degrees. In addition, in the present embodiment, the second angle θ2 and the third angle θ3 maintain a certain relation so as to provide improved panel transmittance.

Figure 8:
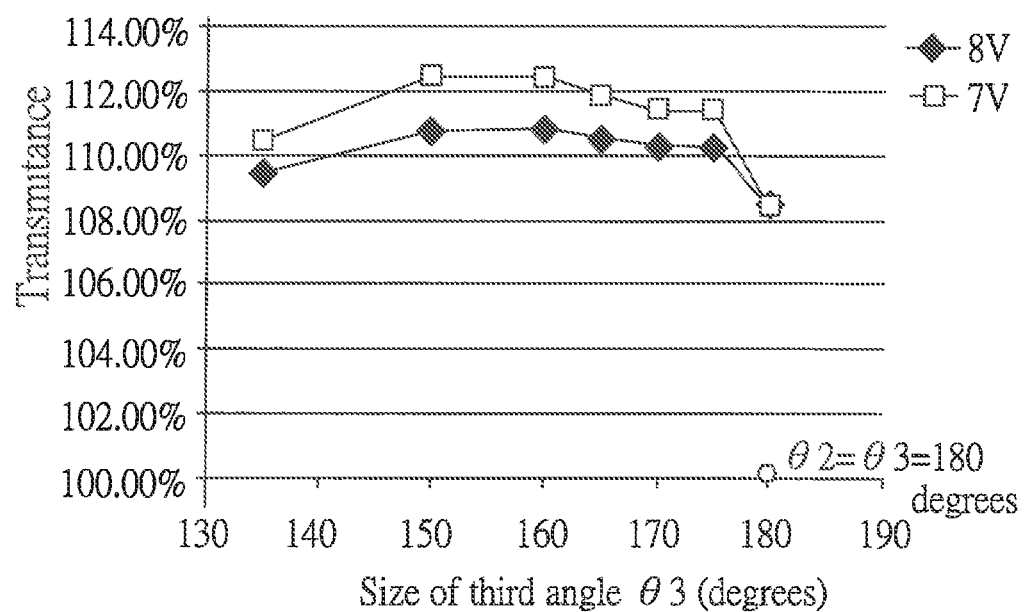
FIG. 8 is a diagram showing the third angle between the second finger portion and the first buffer portion versus the panel transmittance in a display device of an embodiment of the present disclosure.

FIG. 8 is a diagram showing the third angle between the second finger portion and the first buffer portion versus the panel transmittance. Herein, it is assumed that the panel transmittance is 100% when the second angle θ2 and the third angle θ3 are both 180 degrees and the applied voltage is 7V. Based on the assumption, with the second angle θ2 fixed at 150 degrees, the relation between the size of the third angle θ3 and the panel transmittance is discussed. As shown in FIG. 8, when the second angle θ2 is greater than 90 degrees and smaller than 180 degrees and the third angle θ3 is 180 degrees, the transmittance is improved as compared to the case where the second angle θ2 and the third angle θ3 are 180 degrees. In addition, when the second angle θ2 is fixed, tuning the third angle θ3 in terms of size changes the panel transmittance. It proves that the angular variation of the third angle θ3 has impact on the display medium's swing, thereby improving disclination. Thus, for optimizing the panel transmittance, as shown in FIG. 8, the third angle θ3 is between the second angle θ2 plus 27 degrees and the second angle θ2 minus 27 degrees, i.e., the difference between the third angle θ3 and the second angle θ2 is equal to or less than 27 degrees. This is because if the third angle θ3 is smaller than the second angle θ2 by more than 27 degrees, the light-emitting area in a pixel reduces and the transmittance degrades accordingly.

As shown in FIG. 7, in the display device of the present embodiment, the buffer portion comprises a second buffer portion 1624. The second angle θ2 faces the second buffer portion 1624. The side of the second buffer portion 1624 close to the second angle θ2 and one of the second finger portions 1622 connecting to the second buffer portion 1624 include a fourth angle θ4, and the fourth angle θ4 is smaller than 180 degrees. Herein, the fourth angle θ4 is the angle included by the edge 1622a of the second finger portion 1622 and the edge 1624a of the second buffer portion 1624.

Similarly, for optimizing the panel in terms of transmittance, the fourth angle θ4 must keep a certain relation with the second angle θ2 and the third angle θ3, When the fourth angle θ4 is smaller than 180 degrees, it improves the panel's transmittance. Particularly, when the third angle θ3 is smaller than the fourth angle θ4, the panel's transmittance is improved.

Figure 9A:
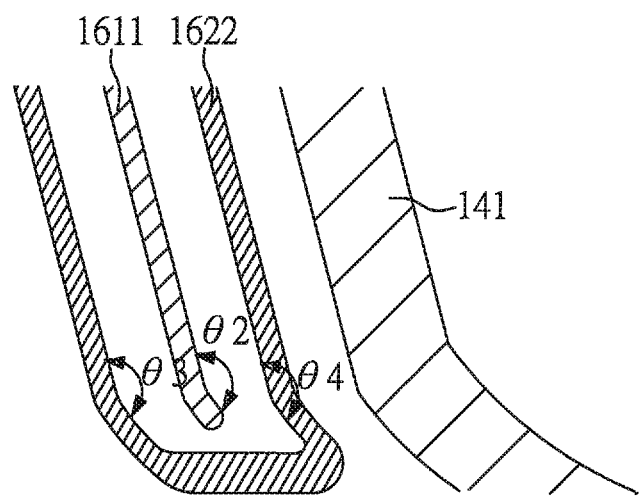
FIGS. 9A and 9B show different arrangements among the first finger portion, the second finger portions and the data line in display devices as comparative examples of the present disclosure.

FIG. 9A shows an arrangement of the first finger portion, the second finger portions and the data line in a display device as one comparative example of the present disclosure. It is similar to FIG. 7 but has the second angle θ2, the third angle θ3 and the fourth angle θ4 all the same degree. Please compare FIG. 9A and FIG. 7. In the case of FIG. 9A, where the second angle θ2, the third angle θ3 and the fourth angle θ4 are all the same degree, while the panel's transmittance is improved due to liquid crystal molecules' good swing, the data line 141 is excessively bent and thus has larger resistance and in turn high RC loading. For preventing this, the fourth angle θ4 shall not be too small (leading to an excessive bend).

Figure 9B:
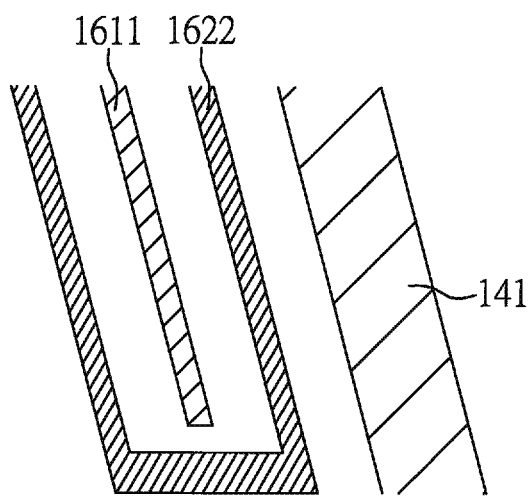

FIG. 9B shows an arrangement of the first finger portion, the second finger portion and the data line in a display device as another comparative example of the present disclosure. It is similar to FIG. 7 but the first electrode does not include the extended portion 1612 and the second electrode does not include the first buffer portion 1623 and the second buffer portion 1624. Please compare FIG. 9B and FIG. 7. In the case of FIG. 9B, while the data line 141 is not as bent as FIG. 9A so can have the RC loading controlled, since the first electrode and the second electrode only have the first finger portion 1611 and the second finger portions 1622, but lack for the extended portion 1612 and the first buffer portion 1623 as well as the second buffer portion 1624 that facilitate liquid crystal molecules' swing, the overall transmittance is relatively low.

Thus, as shown in FIGS. 7, 9A and 9B, when the first electrode comprises the extended portion 1612 and the second electrode comprises the first buffer portion 1623 and the second buffer portion 1624, while a unique relation exists among the second angle θ2, the third angle θ3 and the fourth angle θ4, this structure facilitates display medium swing, thereby improving the overall transmittance of the panel.

In the present disclosure, a display device made as described in any of the embodiments of the present disclosure as described previously may be integrated with a touch panel to form a touch display device. In addition, a display device or touch display device made as described in any of the embodiments of the present disclosure as described previously may be applied to any electronic devices known in the art that need a display screen, such as displays, mobile phones, laptops, video cameras, still cameras, music players, mobile navigators, TV sets, and other electronic devices that display images.

While the above embodiments are provided for illustrating the concept of the present disclosure, it is to be understood that these embodiments in no way limit the scope of the present disclosure which is defined solely by the appended claims.

Although the present disclosure has been explained in relation to its embodiment, it is to be understood that many other possible modifications and variations can be made without departing from the spirit and scope of the present disclosure as hereinafter claimed.

What is claimed is:
1. A display device, comprising:
a first substrate;
a plurality of scan lines and a plurality of data lines, wherein the plurality of scan lines intersect with the plurality of data lines respectively, the plurality of scan lines and the plurality of data lines are disposed above the first substrate, and the plurality of scan lines extend along a first direction;

a first electrode disposed above the first substrate and at least comprising a first finger portion and an extended portion, wherein the first finger portion connects to the extended portion;

a second electrode disposed above the first substrate and comprising a first connecting portion, a plurality of buffer portions, and a plurality of second finger portions, in which the first connecting portion connects to the buffer portions, and the buffer portions connect to the second finger portions respectively; and a common electrode disposed above the first substrate;

wherein the common electrode comprises a first part extending along the first direction and multiple second parts, one of the multiple second parts extends substantially parallel to one of the plurality of data lines, and the first part connects to the multiple second parts, wherein a width of the one of the plurality of data lines in the first direction is greater than a width of the one of the multiple second parts in the first direction; and wherein, in the first direction, the one of the multiple second parts is disposed between the plurality of second finger portions and the one of the plurality of data lines adjacent to the one of the multiple second parts.

2. The display device of claim 1, wherein the first finger portion is substantially parallel to the one of the plurality of data lines.

3. The display device of claim 1, wherein one of the plurality of second finger portions is substantially parallel to the one of the plurality of data lines.

4. The display device of claim 1, wherein the first finger portion and one of the plurality of second finger portions are substantially parallel to each other.

5. The display device of claim 1, wherein one of the first electrode and the second electrode is electrically connecting to the one of the plurality of the data lines while the other is electrically isolated from the one of the plurality of the data lines.

6. The display device of claim 1, wherein the first electrode and the second electrode are coplanar.

7. The display device of claim 1, wherein the first finger portion and the plurality of second finger portions each have an inclined "L" shape.

8. The display device of claim 1, wherein the first part comprises a protrusion in a second direction which is perpendicular to the first direction, the protrusion extends toward one of the plurality of the scan lines adjacent to the protrusion, and the protrusion is disposed between the one of the plurality of the scan lines adjacent to the protrusion and the one of the multiple second parts in the second direction.

9. The display device of claim 8, wherein a first width of the first part including the protrusion in the second direction is greater than a second width of the first part that is adjacent to the protrusion in the second direction.

10. The display device of claim 8, wherein a maximum width of the protrusion in the first direction is greater than a maximum width of the one of the multiple second parts in the first direction.

11. The display device of claim 1, wherein the first part further comprises at least a cave, and a part of the one of the plurality of data lines is disposed in the cave.

12. The display device of claim 1, wherein a second angle is included between the first finger portion and the extended portion, in which the second angle is greater than 90 degrees and smaller than 180 degrees.

13. The display device of claim 12, wherein the plurality of buffer portions further comprise a first buffer portion, in which one side of the first buffer portion adjacent to the second angle and one of the plurality of second finger portions connecting to the first buffer portion include a fourth angle, and the fourth angle is smaller than 180 degrees.

14. The display device of claim 12, wherein one of the plurality of buffer portions has a width in the first direction greater than a width of one of the plurality of second finger portions in the first direction.

15. The display device of claim 1, wherein the one of the multiple second parts has an inclined "L" shape.

16. The display device of claim 1, further comprising:
a second substrate opposite to the first substrate; and
a display medium layer disposed between the first electrode and the second substrate.

17. The display device of claim 1, further comprising another common electrode, wherein the plural scan lines and the plural data lines form plural sub-pixels, each of the sub-pixels is disposed between the common electrode and the another common electrode in a second direction which is perpendicular to the first direction.

* * * * *